United States Patent
Chen et al.

(10) Patent No.: US 11,435,976 B2
(45) Date of Patent: Sep. 6, 2022

(54) METHODS AND SYSTEMS FOR DISPLAYING MEDIA DATA, HOST COMPUTERS, DEVICES, AND MEDIA

(71) Applicants: K-Tronics (Suzhou) Technology Co., Ltd., Suzhou (CN); BOE Technology Group Co., Ltd., Beijing (CN)

(72) Inventors: Fujun Chen, Beijing (CN); Qigui Rong, Beijing (CN)

(73) Assignees: K-Tronics (Suzhou) Technology Co., Ltd., Suzhou (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/298,638

(22) PCT Filed: Aug. 14, 2020

(86) PCT No.: PCT/CN2020/109288
§ 371 (c)(1),
(2) Date: May 31, 2021

(87) PCT Pub. No.: WO2021/032010
PCT Pub. Date: Feb. 25, 2021

(65) Prior Publication Data
US 2022/0011997 A1  Jan. 13, 2022

(30) Foreign Application Priority Data
Aug. 16, 2019 (CN) .......................... 201910756886.5

(51) Int. Cl.
*G06F 3/147* (2006.01)
*H04W 76/11* (2018.01)
*G09G 3/34* (2006.01)

(52) U.S. Cl.
CPC ............. *G06F 3/147* (2013.01); *G09G 3/344* (2013.01); *H04W 76/11* (2018.02);
(Continued)

(58) Field of Classification Search
CPC ............ G09G 2380/04; G09G 2370/16; G09F 3/208; G06Q 30/0241; G06Q 10/087; G06F 3/147; G06F 3/14
See application file for complete search history.

(56) References Cited

U.S. PATENT DOCUMENTS

| | | | |
|---|---|---|---|
| 2004/0035036 A1* | 2/2004 | Wampler | G09F 9/375 40/624 |
| 2013/0201079 A1* | 8/2013 | Chao | G09G 5/12 345/1.2 |

(Continued)

FOREIGN PATENT DOCUMENTS

| | | |
|---|---|---|
| CN | 1591557 A | 3/2005 |
| CN | 101667254 A | 3/2010 |

(Continued)

OTHER PUBLICATIONS

CN201910756886.5 First Office Action.
CN201910756886.5 Second Office Action.
PCT/CN2020/109288 International Search Report.

*Primary Examiner* — Koosha Sharifi-Tafreshi
(74) *Attorney, Agent, or Firm* — IPro, PLLC

(57) ABSTRACT

Disclosed are methods and systems for displaying media data, host computers, devices, and media. A method of triggering electronic signage to display media data, which is executable at a wireless access device, includes: receiving, from a host computer, media data carrying a signage identifier for uniquely identifying the electronic signage; and sending the media data to the electronic signage to which the signage identifier belongs, to trigger the electronic signage to display the media data. A method of triggering electronic signage to display media data, which is executable at a host computer, includes: sending media data carrying a signage
(Continued)

---

Send, by a host computer 10, media data carrying a signage identifier for uniquely identifying the electronic signage to a wireless access device 20, in response to a sending operation from a user Broadcast, by the electronic signage 30, broadcast messages carrying signage identifiers

↓

Scan, by the wireless access device 20, the broadcast messages, search signage identifiers carried in the scanned broadcast messages for a signage identifier that matches the signage identifier carried in the received media data, and forward the media data to electronic signage 30 to which the found signage identifier belongs

↓

Display, on the electronic signage 30, the received media data identifier for uniquely identifying the electronic signage to a wireless access device, to trigger the electronic signage to display the media data.

18 Claims, 2 Drawing Sheets

(52) U.S. Cl.
CPC ..... *G09G 2370/16* (2013.01); *G09G 2370/22* (2013.01); *G09G 2380/04* (2013.01)

(56) References Cited

U.S. PATENT DOCUMENTS

| | | | | |
|---|---|---|---|---|
| 2013/0229260 A1* | 9/2013 | Huang | ............... | G06F 3/147 340/5.91 |
| 2015/0278890 A1* | 10/2015 | Yang | ............... | G06Q 30/00 705/26.1 |
| 2015/0363742 A1* | 12/2015 | Lee | ............... | G06Q 10/08 705/28 |
| 2016/0004891 A1* | 1/2016 | Moon | ............... | G06Q 30/06 340/10.51 |
| 2016/0055562 A1* | 2/2016 | Kim | ............... | G09G 5/12 705/26.61 |
| 2016/0071490 A1* | 3/2016 | Jeong | ............... | G06F 3/147 345/1.3 |
| 2018/0097648 A1 | 4/2018 | Cheng et al. | | |

FOREIGN PATENT DOCUMENTS

| | | |
|---|---|---|
| CN | 104394604 A | 3/2015 |
| CN | 107708181 A | 2/2018 |
| CN | 109874135 A | 6/2019 |
| CN | 110119262 A | 8/2019 |
| CN | 110460991 A | 11/2019 |
| EP | 2234373 A2 | 9/2010 |

\* cited by examiner

METHODS AND SYSTEMS FOR DISPLAYING MEDIA DATA, HOST COMPUTERS, DEVICES, AND MEDIA

CROSS-REFERENCE TO RELATED APPLICATIONS

The present disclosure is the U.S. national phase of PCT Application No. PCT/CN2020/109288 filed on Aug. 14, 2020, which claims a priority of the Chinese patent application No. 201910756886.5 filed on Aug. 16, 2019 and entitled "METHODS AND SYSTEMS FOR DISPLAYING STREAMING MEDIA DATA, HOST COMPUTERS, DEVICES, AND MEDIA", which is incorporated herein by reference in its entirety.

TECHNICAL FIELD

The present disclosure relates to the field of display, and more particularly, to a method and system for displaying media data, a host computer, a device and a medium.

BACKGROUND

At present, signage information may be carried on a product. Information is generally embodied on a non-electronic product, for example, by using paper printing, color printing, or engraving on an object. When the information needs to be changed or updated, it is inconvenient to reuse the product.

SUMMARY

According to a first aspect of the present disclosure, there is provided a method of triggering electronic signage to display media data, which is executable at a wireless access device. The method includes: receiving, from a host computer, media data carrying a signage identifier for uniquely identifying the electronic signage; and sending the media data to the electronic signage to which the signage identifier belongs, to trigger the electronic signage to display the media data.

In some embodiments, the signage identifier may include at least one of MAC address, UDID, or IMEI of the electronic signage. In some embodiments, the method may further include: notifying the host computer of existence of the wireless access device; and receiving configuration information from the host computer to establish communication with the host computer. In some embodiments, the method may further include: acquiring respective connection statuses of a plurality of electronic signage including the electronic signage, in response to a request from the host computer or by periodically scanning the plurality of electronic signage; and sending the connection statuses to the host computer. In some embodiments, the media data may further carry actual physical location information corresponding to the carried signage identifier, and where sending the media data to the electronic signage to which the signage identifier belongs, to trigger the electronic signage to display the media data may include: sending the media data to the electronic signage to which the signage identifier belongs, to trigger the electronic signage to display the actual physical location information. In some embodiments, the method may further include: scanning one or more broadcast messages broadcast by one or more electronic signage and carrying signage identifiers for uniquely identifying the one or more electronic signage; and where sending the media data to the electronic signage to which the signage identifier belongs, to trigger the electronic signage to display the media data may include: searching the signage identifiers carried in the one or more broadcast messages for a signage identifier that matches the signage identifier carried in the media data; and forwarding the media data to electronic signage to which the found signage identifier belongs, to trigger the electronic signage to display the media data.

In some embodiments, scanning the one or more broadcast messages broadcast by the one or more electronic signage and carrying the signage identifiers for uniquely identifying the one or more electronic signage may include: scanning the one or more broadcast messages broadcast by the one or more electronic signage and carrying the signage identifiers for uniquely identifying the one or more electronic signage through a Bluetooth network; and forwarding the media data to the electronic signage to which the found signage identifier belongs may include: forwarding the media data to the electronic signage to which the found signage identifier belongs through the Bluetooth network.

According to a second aspect of the present disclosure, there is provided a wireless access device for triggering electronic signage to display media data. The wireless access device includes: a processor; a second communication module, communicatively coupled with the processor and configured to communicate with the electronic signage; a third communication module, communicatively coupled with the processor and configured to communicate with a host computer; and a memory storing instructions, which, when executed by the processor, cause the processor to perform the method according to any of the foregoing first aspect.

According to a third aspect of the present disclosure, there is provided a method of triggering electronic signage to display media data, which is executable at a host computer. The method includes: sending media data carrying a signage identifier for uniquely identifying the electronic signage to a wireless access device, to trigger the electronic signage to display the media data.

In some embodiments, the signage identifier may include at least one of MAC address, UDID, or IMEI of the electronic signage. In some embodiments, the method may further include: detecting information sent by the wireless access device and indicating existence of the wireless access device; and configuring the wireless access device to establish communication with the wireless access device. In some embodiments, the method may further include: loading and displaying a correspondence relationship on a page, where the correspondence relationship includes a plurality of correspondence entries, and each of the correspondence entries includes a correspondence between a signage identifier and a storage address of the media data; and in response to a selection of one or more correspondence entries from the correspondence entries, acquiring to-be-sent media data carrying corresponding signage identifiers. In some embodiments, the method may further include: receiving connection statuses of one or more electronic signage from the wireless access device; and presenting the connection statuses of the electronic signage to which the corresponding signage identifiers belong in the correspondence entries. In some embodiments, each of the correspondence entries may further include actual physical location information of the electronic signage in a deployment site of the electronic signage to which the signage identifier belongs. In some embodiments, the media data may further carry the actual physical location information corresponding to the carried signage identifier, and where sending the media data carrying the signage identifier for uniquely identifying the electronic signage to the wireless access device, to trigger the electronic signage to display the media data may include: sending the media data carrying the signage identifier for uniquely identifying the electronic signage to the wireless access device, to trigger the electronic signage to display the actual physical location information. In some embodiments, the method may further include: reloading and displaying the correspondence relationship, in which the storage address of the media data in at least one of the correspondence entries is updated.

One or more broadcast messages may be scanned and received by the second communication module 22 of the wireless access device 20, and the media data may be received by the third communication module 23 of the wireless access device 20. The second processor 21 of the wireless access device 20 is configured to: search signage identifiers carried in the one or more broadcast messages scanned and received by the second communication module 22 for a signage identifier that matches the signage identifier carried in the media data received by the third communication module 23; establish a wireless connection with the electronic signage 30 to which the found signage identifier belongs through the second communication module 22; and forward the media data to the electronic signage 30 to which the searched signage identifier belongs. The second communication module 22 is configured to scan and receive the one or more broadcast messages. The term "scan" herein refers to monitoring one or more broadcast messages within a receiving range and receiving them.

According to a fifth aspect of the present disclosure, there is provided a system for displaying media data on a plurality of electronic signage. The system includes: the host computer according to the fourth aspect; the wireless access device according to the second aspect; and one or more electronic signage.

In some embodiments, the electronic signage may include an electronic table card and/or an electronic door plate. In some embodiments, a display of the electronic signage may be an electronic ink display, and the media data may have a bit depth of 1 bit.

According to a sixth aspect of the present disclosure, there is provided a computer-readable storage medium in which a computer program is stored, where the computer program, when executed by a processor, causes the processor to perform the method according to any of the first aspect or the method according to any of the third aspect.

BRIEF DESCRIPTION OF THE DRAWINGS

Embodiments of the present disclosure will be described in further detail below with reference to the accompanying drawings.

DETAILED DESCRIPTION OF THE EMBODIMENTS

Figure 1:
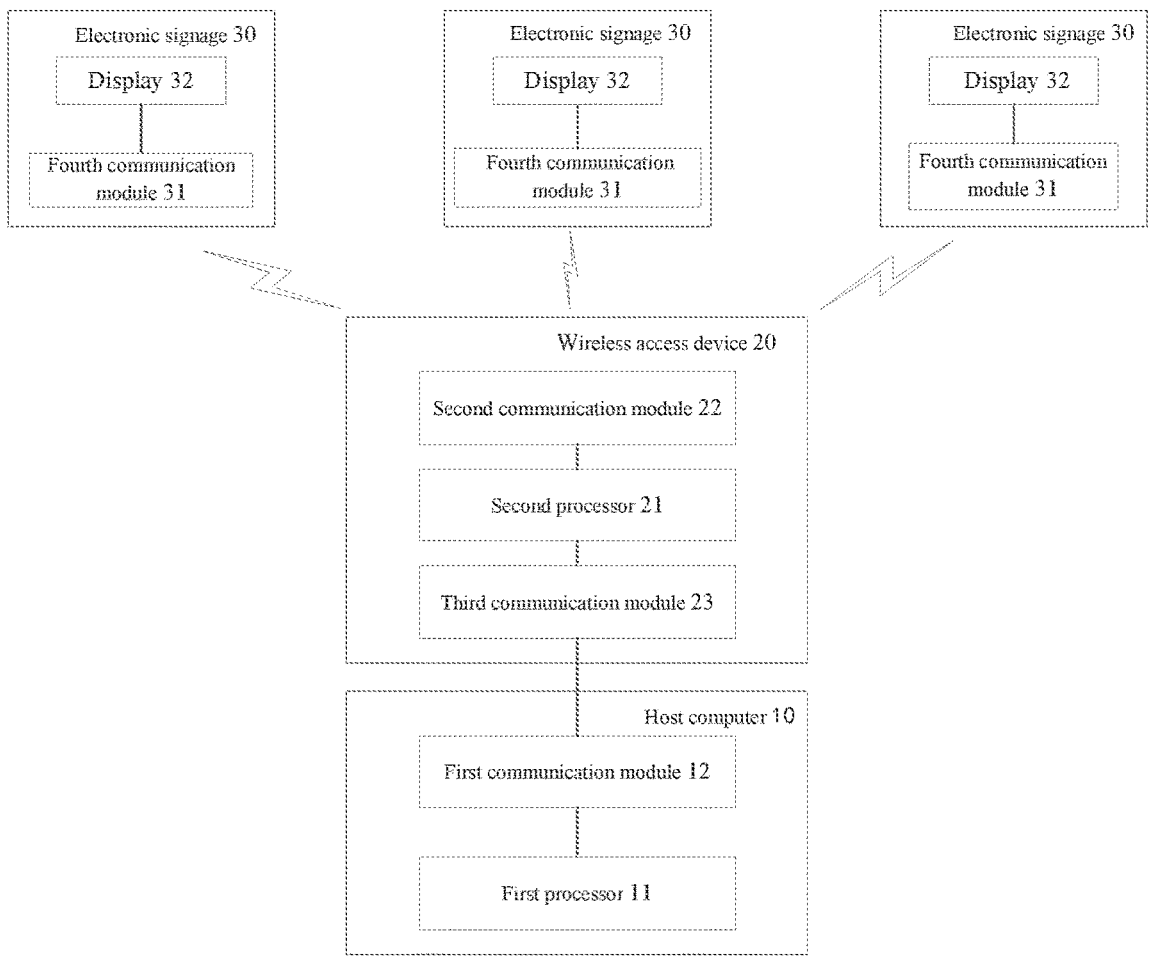
FIG. 1 illustrates a schematic diagram of a system for displaying media data on a plurality of electronic signage according to an embodiment of the present disclosure.

In order to explain the present disclosure more clearly, the present disclosure will be further described below in conjunction with embodiments and drawings. Similar components in the drawings are denoted by the same reference numerals. Those skilled in the art should understand that contents specifically described below are illustrative rather than restrictive, and should not be used to limit the protection scope of the present disclosure.

As shown in FIG. 1, an embodiment of the present disclosure provides a signage system, including a host computer 10, a wireless access device 20, and a plurality of electronic signage 30 in a network connection with the host computer 10 through the wireless access device 20. The host computer 10 may include a first processor 11 and a first communication module 12. The wireless access device 20 may include a second processor 21, a second communication module 22, and a third communication module 23. The electronic signage 30 may include a fourth communication module 31 and a display 32.

The first processor 11 of the host computer 10 is configured to: in response to a sending operation from a user, send media data carrying a signage identifier for uniquely identifying the electronic signage 30 to the wireless access device 20 through the first communication module 12. Each electronic signage 30 has a signage identifier unique to a device, and the signage identifier of each electronic signage 30 is different from those of other electronic signage 30, such that the host computer 30 and the wireless access device 20 may identify and distinguish a plurality of electronic signage 30 that interact with them.

For each of the plurality of electronic signage 30, the fourth communication module 31 is configured to broadcast a broadcast message carrying a signage identifier that is different from those of other electronic signage 30.

According to a fourth aspect of the present disclosure, there is provided a host computer for triggering electronic signage to display media data. The host computer includes: a processor; a first communication module, communicatively coupled with the processor and configured to communicate with a wireless access device; and a memory storing instructions, which, when executed by the processor, cause the processor to perform the method according to any of the foregoing third aspect.

For each of the plurality of electronic signage 30, the fourth communication module 31 is configured to receive the media data such that the display 32 of the electronic signage 30 displays the media data. In an example, the fourth communication module 31 may send the received media data to the display 32 through a serial peripheral interface (SPI), for display on the display 32.

In an example, the host computer 10 may be various electronic devices, including but not limited to a computer, a tablet computer, and the like. The host computer 10 may be in a network connection with the wireless access device 20 through a serial port (serial communication interface), that is, serial communication may be used between the first communication module 12 and the third communication module 23. In addition, it is understandable that depending on a network connection mode between the wireless access device 20 and the host computer 10, a network connection mode between the wireless access device 20 and the plurality of electronic signage 30, and integration of various network connection modes, the wireless access device 20 may include only one communication module configured to communicate with the host computer 10 and the plurality of electronic signage 30, or may include a plurality of communication modules, one of which is configured to communicate with the host computer 10 and the others are configured to communicate with the plurality of electronic signage 30 in a one-to-one correspondence.

The signage system according to this embodiment may enable the host computer 10 to perform centralized management and control on a plurality of electronic signage 30 through the wireless access device 20. That is, the host computer 10 may control display contents on the plurality of electronic signage 30 through the wireless access device 20, and accurately send the media data to the electronic signage 30 to which the signage identifier belongs based on the signage identifier, where the signage identifier is carried in the media data and configured to uniquely identify the electronic signage. In this way, the display content on each electronic signage 30 may be updated efficiently and conveniently, which can ensure the accuracy of the display content while improving the display efficiency and user convenience, and realize simple device maintenance and low cost. It can be applied to a variety of electronic signage 30 such as electronic door plates in an office/conference room, electronic table cards in a conference room, information display boards in a carriage of a rail vehicle (such as a subway), and information display pull rings in a public transportation vehicle (such as a bus), to realize centralized management and control of them. The media data may include one or more of image data, video data, audio data, text data, and the like. For example, for an electronic table card in a conference room, the media data may include profiles of participants, face images, QR codes for sign-in, etc.; for an electronic door plate in a conference room, the media data may include conference introductions, etc.; and for an information display board, the media data may include advertising images, promotional videos, etc. Furthermore, in some embodiments, the media data may be streaming media data. In addition, a single host computer 10 may be connected with a plurality of wireless access devices 20 to perform centralized management and control on the electronic signage 30 wirelessly connected with the plurality of wireless access devices 20, respectively. For example, the single host computer 10 may be used to control display contents on electronic table cards in a plurality of conference rooms, and display contents on electronic door plates in a plurality of conference rooms, where electronic table cards in one conference room and electronic door plates in this conference room may form a conference information display system.

In some optional implementation of this embodiment, the signage identifier may include at least one of MAC (Media Access Control) address, UDID (Unique Device Identifier), or IMEI (International Mobile Equipment Identity) of the electronic signage 30.

In this optional implementation, each of the MAC address, the UDID, and the IMEI may ensure the uniqueness of the identifier of the electronic signage 30. That is, one signage identifier uniquely corresponds to one electronic signage 30, which is beneficial to ensure the accuracy of media data transmission while improving display efficiency and user convenience.

In an example, for the electronic signage 30 adopting an Android system, the signage identifier thereof may include the MAC address and the IMEI, and for the electronic signage 30 adopting an iOS system, the signage identifier thereof may include the MAC address and the UDID, and also include Open UUID (Universally Unique Identifier).

In some optional implementation of this embodiment, the first processor 11 may be further configured to: detect the wireless access device 20: and in response to a configuration operation from the user, configure the wireless access device 20 to establish communication. In some embodiments, detecting the wireless access device 20 may be implemented by detecting information sent by the wireless access device 20 and indicating existence thereof, for example, beacon information, heartbeat information periodically broadcast by the wireless access device 20, etc. In addition, in some embodiments, the configuration operation from the user may trigger the host computer 10 to send configuration information to the wireless access device 20, such that the communication may be established between the host computer 10 and the wireless access device 20.

With this optional implementation, it is convenient for the user to configure connection settings between the host computer 10 and the wireless access device 20 to establish communication between the two.

In some optional implementation of this embodiment, the first processor 11 may be further configured to: in response to a loading operation from the user, load and display a correspondence relationship on a page, where the correspondence relationship may include a plurality of correspondence entries, and each of the correspondence entries may include a correspondence between a signage identifier and a storage address of the media data; and in response to a selection operation of one or more of the correspondence entries from the user, acquire to-be-sent media data carrying corresponding signage identifiers.

With this implementation, it is convenient for the user to clearly and intuitively view correspondences between signage identifiers and media data stored in the host computer 10, which is beneficial for the user to accurately and efficiently select the electronic signage that needs to display the media data and the media data to be sent to the electronic signage.

In some optional implementation of this embodiment, the first processor 11 may be further configured to: in response to a query operation from the user, present, in the correspondence entries, connection statuses of the electronic signage to which the corresponding signage identifiers belong, where the connection statuses may be acquired by scanning a plurality of electronic signage 30 using the wireless access device 20. In some embodiments, the connection statuses may be acquired in response to a request from the host computer 10 or by periodically scanning the plurality of electronic signage 30.

With this implementation, it is convenient for the user to check the connection status of each electronic signage, so as to avoid invalid sending of the media data.

Further, the first processor 11 may be further configured to: in response to the wireless access device 20 scanning no electronic signage 30, render the correspondence entries to be unselectable, so as to further avoid invalid sending of the media data.

In some optional implementation of this embodiment, each of the correspondence entries may further include actual physical location information of the electronic signage 30 in a deployment site of the electronic signage to which the signage identifier belongs.

Since compared with the signage identifier or serial number, it is easier for the user to remember and distinguish the electronic signage 30 to which the signage identifier in the correspondence relationship belongs by using the actual physical location information, with this optional implementation, it is more convenient for the user to clearly view correspondences between signage identifiers and media data stored in the host computer 10, which is more beneficial for the user to accurately and efficiently select the electronic signage 30 that needs to display the media data and the media data to be sent to the electronic signage 30.

In some optional implementation of this embodiment, the media data may further carry the actual physical location information corresponding to the carried signage identifier. Displaying the media data on the electronic signage may further include displaying the actual physical location information on the electronic signage.

With this implementation, it is convenient for the user to check whether the media data displayed on the electronic signage is correct, and to discover an error in the correspondence relationship in time to correct it in time, for example, to resend the correct media data to the corresponding electronic signage 30.

In some optional implementation of this embodiment, the first processor 11 may be further configured to: in response to an update operation from the user, reload and display the correspondence relationship, in which the storage address of the media data in at least one of the correspondence entries is updated.

With this implementation, it is convenient for the user to update the correspondence relationship between the signage identifiers and the media data stored in the host computer 10. When it is found that the media data displayed on the electronic signage 30 is incorrect or the media data to be displayed on each electronic signage 30 needs to be updated, the correspondence relationship between the signage identifier and the media data may be updated conveniently and efficiently by changing the media data corresponding to the signage identifier.

In an example where the electronic signage 30 is an electronic table card, and the media data includes images containing profiles of participants, the host computer 10 may store a correspondence relationship between signage identifiers and the media data created by the user, and the correspondence relationship may be mapped to correspondences between the electronic table cards and the profiles of the participants. The correspondence relationship between the signage identifiers and the media data may be created and stored in the host computer 10 by the user in advance. The user may use an EXCEL tool to create a correspondence table between the signage identifiers and the media data and store it in the host computer 10. The MAC address of the electronic signage 30 is a unique identifier that the electronic signage 30 has in a network card chip when it leaves the factory, and may be directly read by the user from the electronic signage 30 and then input into the host computer 10, or obtained by the host computer 10 reading broadcast information broadcast by the electronic signage 30 scanned by the wireless access device 20. For example, the correspondence table including a plurality of correspondence entries is shown in FIG. 2 and the following table.

| Number | MAC address | Status | Location | Image address |
|---|---|---|---|---|
| 1 | MAC address 1 | 80% | Location 1 | Image storage address 1 |
| 2 | MAC address 2 | 90% | Location 2 | Image storage address 2 |
| 3 | MAC address 3 | 85% | Location 3 | Image storage address 3 |
| 4 | MAC address 4 | 75% | Location 4 | Image storage address 4 |
| 5 | MAC address 5 | 85% | Location 5 | Image storage address 5 |

In the above correspondence table, each row as one correspondence entry, including the corresponding MAC address and image. In addition, a connection status and actual physical location information corresponding to the MAC address may also be included in each row for the user to view. The connection status with a percentage value indicates a signal strength (the higher the value, the stronger the signal). The actual physical location information may be set/filled in the correspondence table by the user according to an actual location of the electronic signage 30. For example, the actual physical location information of the electronic table card may be as follows: Location 1 may be the first position from the left in the first row, Location 2 may be the second position from the left in the first row, Location 4 may be the sixth position from the left in the fifth row, and so on.

Figure 2:
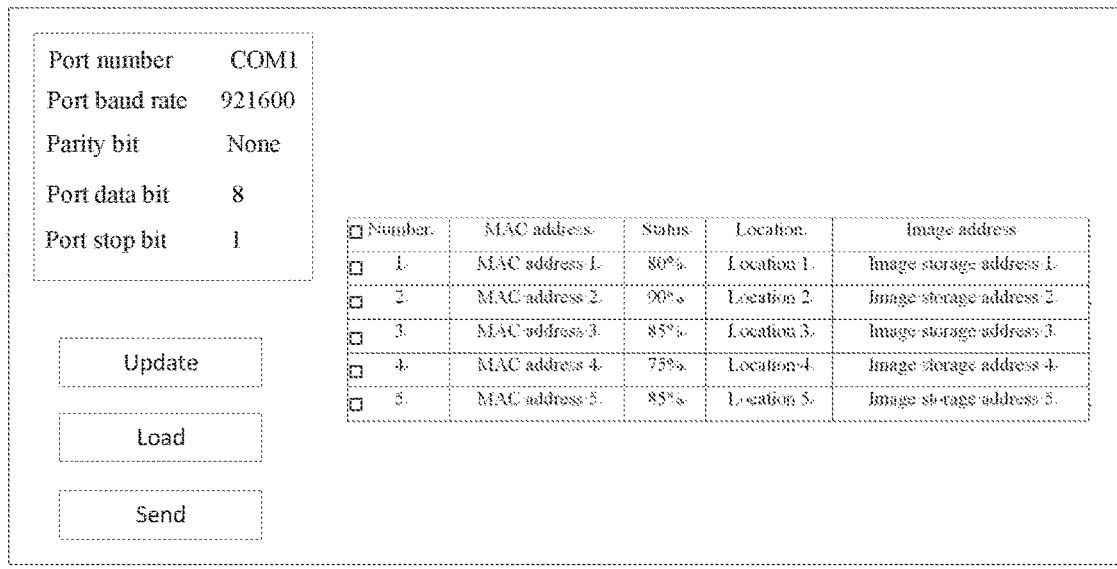
FIG. 2 illustrates a schematic diagram of an operating interface of a host computer.

As shown in FIG. 2, the host computer 10 may present, through a display thereof, a configuration area including a plurality of configuration modules and a table area for presenting the correspondence table.

The first processor 11 may configure the connection settings between the host computer 10 and the wireless access device 20 in response to parameter selection/filling in items such as a port number and a port baud rate.

The first processor 11 may load the correspondence table and present it in the table area in response to the user clicking on a loading module presented in the configuration area through a mouse.

The first processor 11 may change the image storage address of an entry in response to operations of clicking on a selection box module presented before the serial number of the entry through the mouse, clicking on an update module presented in the configuration area through the mouse and changing the image storage address in a pop-up edit window, sequentially performed by the user according to the participants and seat arrangements, so as to change the image corresponding to the MAC address in the entry, and update the correspondence table. For example, when the user sequentially performs operations of clicking on the selection box module presented before the serial number 1, clicking on the update module presented in the configuration area, and changing the "Image storage address 1" to "Image storage address 6" in the pop-up edit window, the first processor 11 may correspond the "MAC address 1" to the "Image storage address 6", and display "Image storage address 6" in the first row of an "Image address" column in the presented correspondence table. In addition, an image name (such as the name of the participant) may be displayed in the "Image address" column of the correspondence table while the image storage address may be hidden for the user to view. Although the image storage address is hidden, the host computer 10 may directly acquire the hidden image storage address through the table so as to retrieve image data.

Figure 3:
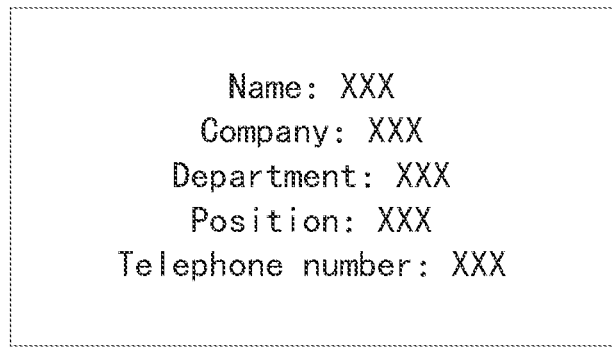
FIG. 3 illustrates a schematic diagram of a display content on an electronic table card.

The first processor 11 may acquire to-be-sent image data carrying the MAC address of the electronic table card and send it to the wireless access device 20, in response to operations of clicking on the selection box module presented before the serial number of an entry through the mouse, and clicking on a sending module presented in the configuration area by the mouse, sequentially performed by the user. The wireless access device 20 may forward the image data to the electronic table card to which the MAC address of the electronic table card belongs, such that the electronic table card may display the image data and present the profile of the participant. For example, the display content on the electronic table card may include the profile of the participant such as name, company, department, position, and telephone number of the participant, as shown in FIG. 3. In addition, the electronic table card may include two displays respectively provided on both sides thereof: a front display (facing away from the seat) used to display at least part of the media data (such as the profile of the participant) towards a conference podium, and a back display (facing the seat) used to display at least part of the media data (such as name, and conference introduction) and the actual physical location information to the participants.

In some optional implementation of this embodiment, the wireless access device 20 may be connected with at least one electronic signage 30 through a Bluetooth network, that is, the second communication module 22 of the wireless access device 20 and the fourth communication module 31 of each electronic signage 30 are Bluetooth communication modules. In an example, the second communication module 22 and each fourth communication module 31 may be implemented by low-power Bluetooth chips, respectively. The wireless access device 20 and each electronic signage 30 may form a BLE (Bluetooth Low Energy) Mesh network.

This implementation is suitable for scenarios where the wireless access device 20 needs to be connected with a plurality of (tens or even hundreds of) electronic signage 30, and is suitable for various environments such as indoors and outdoors.

In some optional implementation of this embodiment, the electronic signage 30 may include an electronic table card and/or an electronic door plate.

In this implementation, display contents on the electronic table cards (used to display participant information) and the electronic door plates (used to display conference information) in a conference room, which need to be updated frequently, may be controlled accurately, efficiently and conveniently, such that display contents on the conference information display system may be controlled.

In some optional implementation of this embodiment, the display of the electronic signage 30 may be an electronic ink display, and the media data may have a bit depth of 1 bit, that is, the first processor 11 of the host computer 10 may convert the bit depth of the media data carrying the signage identifier to 1 before sending the media data to the wireless access device 20 through the first communication module 12.

With this implementation, power consumption of the electronic signage may be saved (only two button batteries are needed for the electronic signage to normally operate for 3-5 years), battery life and service life of the electronic signage may be extended, and data transmission may be saved and the transmission efficiency may be improved without affecting a display quality. It is suitable for scenarios where conference information is displayed on the electronic signage 30 which includes an electronic table card and an electronic door plate.

Figure 4:
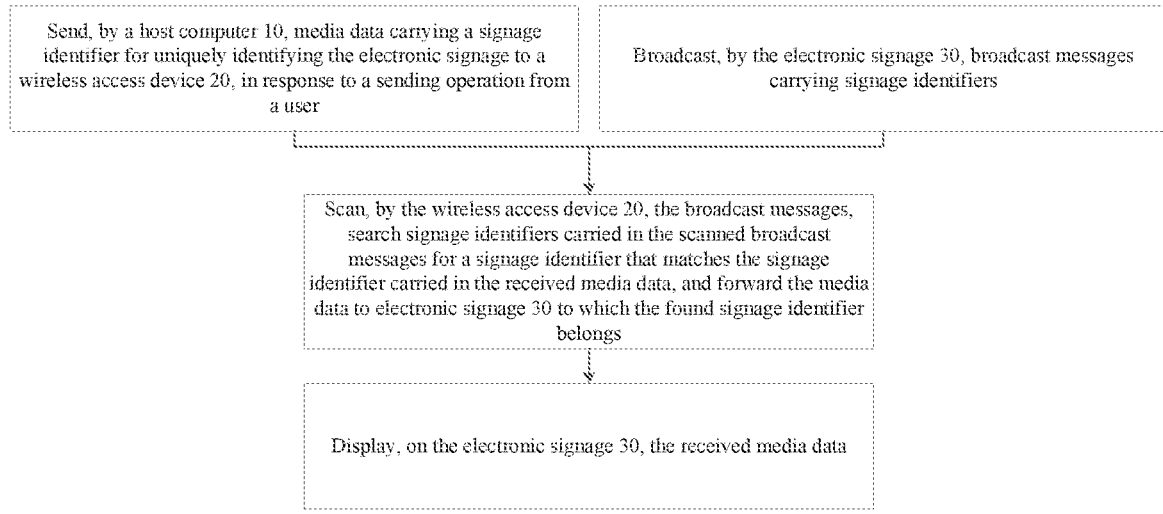
FIG. 4 illustrates a flowchart of a method of displaying media data on a plurality of electronic signage according to an embodiment of the present disclosure.

As shown in FIG. 4, another embodiment of the present disclosure provides a method of displaying media data on a plurality of electronic signage, including:

sending, by a host computer 10, media data carrying a signage identifier for uniquely identifying the electronic signage to a wireless access device 20, in response to a sending operation from a user;

broadcasting, by the plurality of electronic signage 30, a plurality of broadcast messages carrying signage identifiers;

scanning, by the wireless access device 20, the broadcast messages, searching signage identifiers carried in the scanned broadcast messages for a signage identifier that matches the signage identifier carried in the received media data, and forwarding the media data to electronic signage 30 to which the found signage identifier belongs; and displaying, on the electronic signage 30, the received media data.

In some optional implementation of this embodiment, the signage identifier may include at least one of MAC address, UDID, or IMEI of the electronic signage 30.

In some optional implementation of this embodiment, the method may further include:

detecting, by the host computer 10, the wireless access device 20; and configuring, by the host computer 10, the wireless access device 20 to establish communication, in response to a configuration operation from the user.

In some optional implementation of this embodiment, the method may further include:

loading and displaying, by the host computer 10, a correspondence relationship on a page, in response to a loading operation from the user, where the correspondence relationship includes a plurality of correspondence entries, and each of the correspondence entries includes a correspondence between a signage identifier and a storage address of the media data; and acquiring, by the host computer 10, to-be-sent media data carrying corresponding signage identifiers, in response to a selection operation of one or more of the correspondence entries from the user.

In some optional implementation of this embodiment, the method may further include:

presenting, by the host computer 10, in the correspondence entries, connection statuses of the electronic signage 30 to which the corresponding signage identifiers belong, in response to a query operation from the user, where the connection statuses may be acquired by scanning the plurality of electronic signage 30 using the wireless access device 20.

Further, the method may further include: rendering, by the host computer 10, the correspondence entries to be unselectable, in response to the wireless access device 20 scanning no electronic signage 30.

In some optional implementation of this embodiment, each of the correspondence entries may further include actual physical location information of the electronic signage 30 in a deployment site of the electronic signage to which the signage identifier belongs.

In some optional implementation of this embodiment, the media data may further carry the actual physical location information corresponding to the carried signage identifier. Displaying the media data on the electronic signage 30 may further include displaying the actual physical location information on the electronic signage 30.

In some optional implementation of this embodiment, the method may further include:

in response to an update operation from the user, reloading and displaying, by the host computer 10, the correspondence relationship in which the storage address of the media data in at least one of the correspondence entries is updated.

In some optional implementation of this embodiment, the method may further include: connecting the wireless access device 20 with at least one electronic signage 30 through a Bluetooth network.

In some optional implementation of this embodiment, the electronic signage 30 may include an electronic table card and/or an electronic door plate.

In some optional implementation of this embodiment, a display of the electronic signage 30 may be an electronic ink display, and the media data may have a bit depth of 1 bit.

It should be noted that the method of displaying media data on a plurality of electronic signage according to this embodiment is similar in principle and workflow to the system for displaying media data on a plurality of electronic signage according to the above embodiment. For the relevant portions, reference may be made to the above description, which will not be repeated herein.

Figure 5:
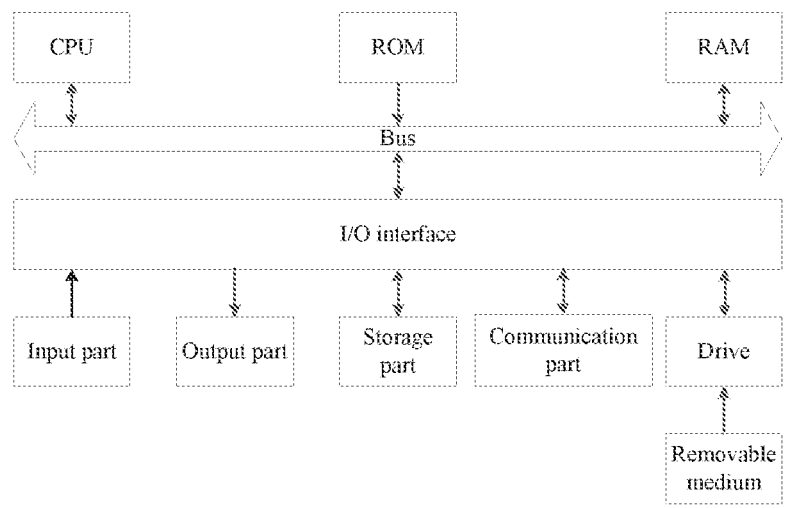
FIG. 5 illustrates a schematic structural diagram of a host computer.

As shown in FIG. 5, a computer system suitable for implementing the host computer 10 according to the above embodiments may include a central processing unit (CPU), which may perform various appropriate actions and processing based on a program stored in a read-only memory (ROM) or a program loaded to a random access memory (RAM) from a storage part. Various programs and data required for operations of the computer system may also be stored in the RAM. The CPU, ROM and RAM may be connected with each other by a bus. An input/output (I/O) interface may also be connected to the bus.

Components connected with the I/O interface may include: an input part including a keyboard, a mouse, and the like; an output part including a liquid crystal display (LCD), a speaker, and the like; the storage part including a hard disk, and the like; and a communication part including a network interface card such as an LAN card and a modem. The communication part may perform communication processing via a network such as the Internet. A drive may also be connected with the I/O interface as needed. Removable media, such as magnetic disks, optical disks, magneto-optical disks, and semiconductor memories, may be installed on the drive as needed, such that a computer program read therefrom may be installed into the storage part as needed.

In particular, according to this embodiment, the process described in the above flowchart may be implemented as a computer software program. For example, this embodiment includes a computer program product, which includes a computer program tangibly contained in a computer-readable medium, and including program codes for executing the method shown in the flowchart. In such an embodiment, the computer program may be downloaded and installed from the network through the communication part, and/or installed from a removable medium.

The flowcharts and schematic diagrams in the drawings illustrate the possible architecture, functions, and operations of the system, method, and computer program product in this embodiment. In this regard, each block in the flowcharts or schematic diagrams may represent a module, a program segment, or a part of the codes, which contains one or more execute instructions for realizing specified logic functions. It should be noted that, in some alternative implementations, the functions marked in the blocks may also occur in a different order than that marked in the drawings. For example, two blocks shown in succession may actually be executed substantially in parallel, and may sometimes be executed in the reverse order, depending on the functions involved. It should also be noted that each block in the schematic diagrams and/or flowcharts, and a combination of the blocks in the schematic diagrams and/or flowcharts, may be implemented by a dedicated hardware-based system that performs specified functions or operations, or by a combination of a dedicated hardware and computer instructions.

In another aspect, this embodiment also provides a non-volatile computer storage medium, which may be a non-volatile computer storage medium included in the above apparatus in the above embodiment, or a non-volatile computer storage medium that exists alone and is not assembled into a terminal. The aforementioned non-volatile computer storage medium stores one or more programs, which, when executed by a device, cause the device to: in response to a sending operation from a user, send media data carrying a signage identifier to the electronic signage 30 to which the signage identifier belongs through the wireless access device 20, such that the electronic signage 30 displays the media data, where the signage identifier is configured to uniquely identify the electronic signage 30.

It should be noted that in the description of the present disclosure, relational terms such as "first" and "second" are only used to distinguish one entity or operation from another entity or operation, and do not necessarily require or imply that there is any such actual relationship or order between these entities or operations. Moreover, terms "include", "comprise" or any other variants thereof are intended to cover non-exclusive inclusion, such that a process, method, article or device including a series of elements includes not only those elements, but also other elements that are not explicitly listed, or elements inherent to this process, method, article or device. Without more restrictions, the element defined by the sentence "including a . . . " does not exclude the existence of other identical elements in the process, method, article or device that includes the element.

Obviously, the above embodiments of the present disclosure are merely examples to clearly illustrate the present disclosure, and are not intended to limit the embodiments of the present disclosure. For those ordinary skilled in the art, other changes or modifications in various forms may be made on the basis of the above description. It is impossible to exhaustively list all the embodiments here, and any obvious changes or modifications derived from the technical solutions of the present disclosure are still within the protection scope of the present disclosure.

The invention claimed is:

1. A method of triggering electronic signage to display media data, which is executable at a wireless access device, the method comprising:
   receiving, from a host computer, media data carrying a signage identifier for uniquely identifying the electronic signage; and
   sending the media data to the electronic signage to which the signage identifier belongs, to trigger the electronic signage to display the media data,
   wherein the media data further carries actual physical location information corresponding to the carried signage identifier, and
   wherein sending the media data to the electronic signage to which the signage identifier belongs, to trigger the electronic signage to display the media data comprises: sending the media data to the electronic signage to which the signage identifier belongs, to trigger the electronic signage to display the actual physical location information.

2. The method according to claim 1, wherein the signage identifier comprises at least one of MAC address, UDID, or IMEI of the electronic signage.

3. The method according to claim 1, further comprising:
   notifying the host computer of existence of the wireless access device; and
   receiving configuration information from the host computer to establish communication between the wireless access device and the host computer.

4. The method according to claim 1, further comprising:
   acquiring respective connection statuses of a plurality of electronic signage comprising the electronic signage, in response to a request from the host computer or by periodically scanning the plurality of electronic signage; and
   sending the connection statuses to the host computer.

5. The method according to claim 1, further comprising:
scanning one or more broadcast messages broadcast by one or more electronic signage and carrying signage identifiers for uniquely identifying the one or more electronic signage; and
wherein sending the media data to the electronic signage to which the signage identifier belongs, to trigger the electronic signage to display the media data comprises:
searching the signage identifiers carried in the one or more broadcast messages for a signage identifier that matches the signage identifier carried in the media data; and
forwarding the media data to electronic signage to which the found signage identifier belongs, to trigger the electronic signage to display the media data.

6. The method according to claim 5, wherein
scanning the one or more broadcast messages broadcast by the one or more electronic signage and carrying the signage identifiers for uniquely identifying the one or more electronic signage comprises: scanning the one or more broadcast messages broadcast by the one or more electronic signage and carrying the signage identifiers for uniquely identifying the one or more electronic signage through a Bluetooth network; and
forwarding the media data to the electronic signage to which the found signage identifier belongs comprises: forwarding the media data to the electronic signage to which the found signage identifier belongs through the Bluetooth network.

7. A wireless access device for triggering electronic signage to display media data, the device comprising:
a processor;
a second communication module, communicatively coupled with the processor and configured to communicate with the electronic signage;
a third communication module, communicatively coupled with the processor and configured to communicate with a host computer; and
a memory storing instructions, which, when executed by the processor, cause the processor to perform the method according to claim 1.

8. A method of triggering electronic signage to display media data, which is executable at a host computer, the method comprising:
sending media data carrying a signage identifier for uniquely identifying the electronic signage to a wireless access device, to trigger the electronic signage to display the media data,
wherein the media data further carries actual physical location information corresponding to the carried signage identifier, and
wherein sending the media data carrying the signage identifier for uniquely identifying the electronic signage to the wireless access device, to trigger the electronic signage to display the media data comprises:
sending the media data carrying the signage identifier for uniquely identifying the electronic signage to the wireless access device, to trigger the electronic signage to display the actual physical location information.

9. The method according to claim 8, wherein the signage identifier comprises at least one of MAC address, UDID, or IMEI of the electronic signage.

10. The method according to claim 8, further comprising:
detecting information sent by the wireless access device and indicating existence of the wireless access device; and
configuring the wireless access device to establish communication between the host computer and the wireless access device.

11. The method according to claim 8, further comprising:
loading and displaying a correspondence relationship on a page, wherein the correspondence relationship comprises a plurality of correspondence entries, and each of the correspondence entries comprises a correspondence between a signage identifier and a storage address of the media data; and
in response to a selection of one or more correspondence entries from the correspondence entries, acquiring to-be-sent media data carrying corresponding signage identifiers.

12. The method according to claim 11, further comprising:
receiving connection statuses of one or more electronic signage from the wireless access device; and
presenting the connection statuses of the electronic signage to which the corresponding signage identifiers belong in the correspondence entries.

13. The method according to claim 11, wherein each of the correspondence entries further comprises the actual physical location information of the electronic signage in a deployment site of the electronic signage to which the signage identifier belongs.

14. The method according to claim 11, further comprising:
reloading and displaying the correspondence relationship, in which the storage address of the media data in at least one of the correspondence entries is updated.

15. A host computer for triggering electronic signage to display media data, comprising:
a processor;
a first communication module, communicatively coupled with the processor and configured to communicate with a wireless access device; and
a memory storing instructions, which, when executed by the processor, cause the processor to perform the method according to claim 8.

16. A system for displaying media data on electronic signage, comprising a host computer, a wireless access device, and one or more electronic signage, wherein
the host computer comprises:
a first processor;
a first communication module, communicatively coupled with the first processor and configured to communicate with the wireless access device; and
a first memory storing instructions, which, when executed by the first processor, cause the first processor to: send media data carrying a signage identifier for uniquely identifying the electronic signage to the wireless access device, and
the wireless access device comprises:
a second processor;
a second communication module, communicatively coupled with the second processor and configured to communicate with the electronic signage;
a third communication module, communicatively coupled with the second processor and configured to communicate with the host computer; and
a second memory storing instructions, which, when executed by the second processor, cause the second processor to: receive, from the host computer, the media data carrying the signage identifier for uniquely identifying the electronic signage; and send the media data to the electronic signage to which the signage identifier belongs, to trigger the electronic si signage to display the media data, wherein the media data further carries actual physical location information corresponding to the carried signage identifier, and the second processor is further caused to: send the media data to the electronic signage to which the signage identifier belongs, to trigger the electronic signage to display the actual physical location information.

17. The system according to claim 16, wherein the electronic signage comprises an electronic table card and/or an electronic door plate.

18. The system according to claim 16, wherein a display of the electronic signage is an electronic ink display, and the media data has a bit depth of 1 bit.

\* \* \* \* \*